United States Patent Office 3,610,025
Patented Oct. 5, 1971

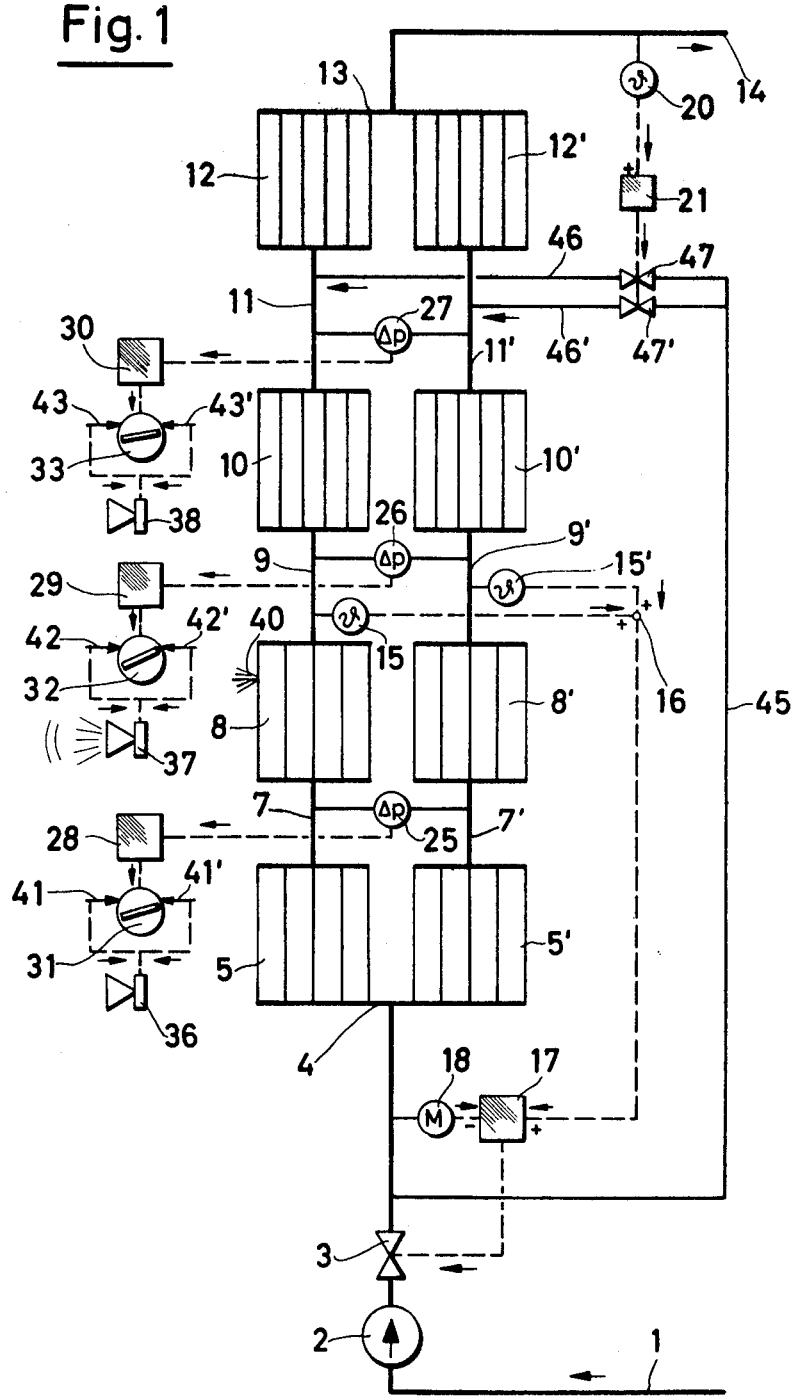

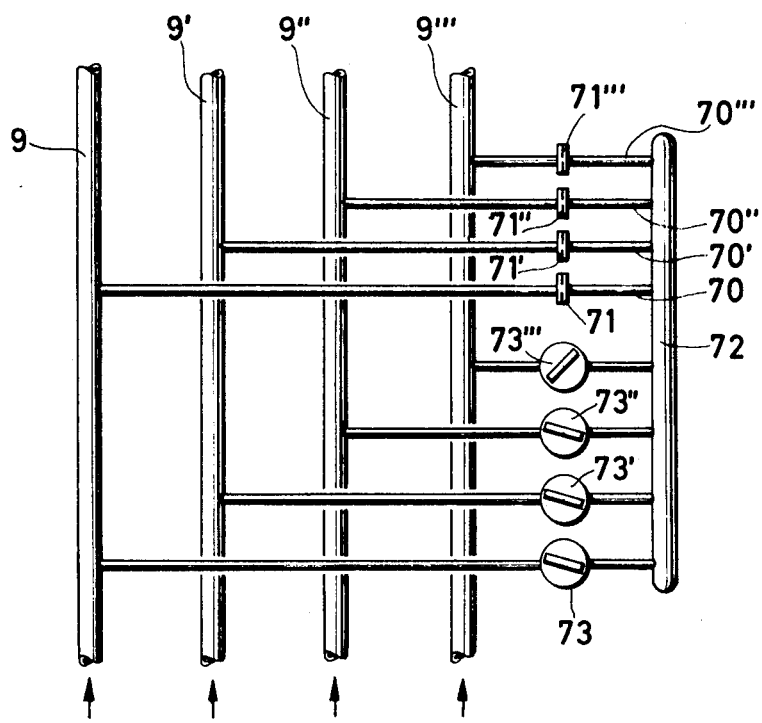

3,610,025
TUBE LEAK DETECTOR
Alfred Brunner, Winterthur, Switzerland, assignor to Sulzer Brothers, Ltd., Winterthur, Switzerland
Filed Mar. 12, 1969, Ser. No. 806,627
Claims priority, application Switzerland, Mar. 15, 1968, 3,921/68
Int. Cl. G01m 3/28
U.S. Cl. 73—40.5    5 Claims

ABSTRACT OF THE DISCLOSURE

The tube leak detector system compares the values of an operating variable of the working medium, such as pressure or temperature, at corresponding points in the parallel flow paths to determine the existence of differences in the values which would indicate a leak in a flow path. The difference is used to activate an indicating instrument to signal the presence of a leak.

---

This invention relates to a tube leak detector. More particularly, this invention relates to a tube leak detector for a forced flow steam generator.

Forced flow steam generators have been known in which a tube system comprising at least two parallel working medium flow paths arranged for substantially the same rate of flow through each has been used. These flow paths have usually contained the same number of heating surfaces connected in series and the corresponding heating surfaces of the several paths have been of substantially identical construction.

In these steam generators, it has been desirable and necessary in some cases to detect immediately any damage which occurs to the tubes of the system during operation of the steam generator and which leads to leakage from the tubes. If such damage to the tubes remains undiscovered, interference with the operation of the steam generators results since the damage increases progressively. Moreover, the steam generator operations would be adversely affected by the loss of the leaking working medium. However, the problem of detection is particularly difficult and also particularly important in forced flow steam generators which are used in nuclear reactor plants where monitoring either by the naked eye or with television equipment may be impossible because of radiation originating from the reactor itself or from radioactive contamination of the media taking part in the heat exchange in the steam generator.

Accordingly, it is an object of the invention to detect a leak in the tube system of a steam generator by comparing the pressures in the tubes at corresponding points on all the paths of an operating variable of the working medium.

It is another object of the invention to transmit a warning signal in response to the detection of a leak.

It is another object of the invention to automatically initiate a control action in response to the detection of a leak in order to counteract the effects of the leak.

It is another object of the invention to detect the presence and location of a leak in the tube system of a steam generator in a simple reliable manner.

Briefly, the invention provides a leak detector system in a steam generator which determines the existence of a leak by a determination of the pressures at different locations in the steam generator. The leak detection system is generally incorporated into a steam generator having a tube system which includes at least two parallel flow paths for a working medium which are arranged for conducting substantially the same rate of flow. Further, each flow path contains the same number of heating surfaces connected in series with corresponding heating surfaces of the several paths being of substantially identical construction. The leak detection system is interconnected at corresponding points to all the paths to compare the values of an operating variable of the working medium which changes in the event of a leak at corresponding points on all the paths so as to transmit a signal in response to a comparison which indicates a leak.

The comparison may be a direct one in which the values are compared with each other or may be indirect in which the values are each compared with some other value. Thus, in one embodiment, a pressure difference measuring device is connected between the flow paths of a steam generator which has two parallel flow paths or, if there are more than two flow paths, between two of such parallel flow paths for the working medium. The pressure difference measuring device is further arranged to transmit a signal if the difference measured exceeds a predetermined amount. Also, in the case of more than two parallel flow paths for the working medium, the detector system may include means for forming a mean value from the values of the operating variable, and means to compare each value to the operating value with the mean value and to transmit a signal if any value of the operating variable differs from the mean value by more than a predetermined amount. Where the operating value is the pressure of the working medium in the parallel flow paths, the means for forming the mean value may comprise a pressure equalising vessel connected to each of the flow paths.

These and other objects and advantages of the invention will become more apparent from the following detailed description and appended claims taken in conjunction with the accompanying drawings in which:

FIG. 1 diagrammatically illustrates a tube leakage detector system of the invention for a steam generator having two parallel flow paths for working medium, and FIG. 2 illustrates a detector system of the invention for a steam generator having four parallel flow paths for working medium.

Referring to FIG. 1, the steam generator has a tube system which comprises two flow paths connected in parallel and extending between an inlet distributor 4 and an outlet collector 13. The two paths are identical in construction and each comprise an economiser heating surfaces 5, 5', an evaporator heating surface 8, 8', a first superheater heating surface 10, 10', and a final superheater heating surface 12, 12' which are connected in series; connecting lines 7, 7'; 9, 9'; 11, 11' being disposed between the successive heating surfaces. The inlet distributor 4 is connected to a feed water line 1 having a feed pump 2 and a feed valve 3, and the outlet collector 13 is connected to a live steam line 14 extending to a load (not shown).

Associated with both flow paths is a common feed water flow regulating circuit having a flowmeter 18 connected to the feed line 1 and a control unit 17 whose output acts on the feed valve 3. A set value signal is supplied to the control unit 17 from an addition point 16 which adds two steam temperature signals supplied by temperature sensors 15, 15' on the connecting lines 9, 9' between the outlet of the evaporator heating surfaces 8, 8' and the entry to the first superheater heating surfaces 10, 10'. This arrangement distributes the total quantity of feed water uniformly between the two flow paths. Branching off between the feed valve 3 and the flowmeter 18 is an attemperator water line 45 which is divided into two branch lines 46, 46'. Each branch line 46, 46' contains an injector valve 47, 47' and discharges into the connecting line 11, 11' between the first superheater heating surfaces 10, 10' and the final superheater heating surfaces 12, 12'. The injector valves 47, 47' are adjusted by a control unit 21 in dependence on the live steam temperature measured by a temperature sensor 20 connected into the live steam line 14.

The tube leakage detector system comprises three differential pressure measuring members 25, 26, 27, three transducers 28, 29, 30, three indicating instruments 31, 32, 33 which have indicating beams as is known, and three alarm devices 36, 37, 38. One differential pressure measuring member 25 is connected to the two connecting lines 7, 7' provided between the economiser heating surfaces 5, 5' and the evaporator heating surfaces 8, 8' in order to measure changes in pressure and its output is connected to the transducers 28 to transmit a signal thereto corresponding to a measured change in pressure, for example, where the difference measured exceeds a predetermined amount.

The output of the transducers 28 is in turn connected to the indicating instrument 31 which has two limit contacts 41, 41' which are connected to the alarm device 36. The transducer thus functions in a known manner to emit a signal to the indicating instrument 31 to control the position of a pivotally mounted indicating beam in the indicating instrument 31 in proportional response to the signal received by the transducer 28. Similarly, a second differential pressure measuring member 26 is connected to the connecting lines 9, 9' and connected via the transducer 29 and the indicating instrument 32 having limit contacts 42, 42' to the alarm device 37. The same construction applied to the third member 27, which is connected between the connecting lines 11, 11' and is associated with the transducer 30, the indicating instrument 33 having limit contacts 43, 43' and the alarm device 38.

When the steam generator is operating normally, for reasons of symmetry, the differences between the pressures measured by the differential pressure measuring members 25, 26, 27 are slight. Accordingly, the output signals of the transducers 28, 29, 30 differ only slightly, and the indicating beams of the indicating instruments 31, 32, 33 are substantially horizontal.

If a leakage occurs in the evaporator heating surface 8, for example, at a point 40, in the central portion of the left-hand line, the pressure of the working medium drops in comparison with that in the right-hand line, while the working medium pressures in the inlet collector 4 and the discharge distributor 13 remain unchanged. As a consequence of the pressure dropping because of the leak, the beam of the indicating instrument 32, which is associated with the connecting lines 9, 9' nearest the place of leakage, is deflected more than those of the two other indicating instruments 31, 33. Further, when the deflection of the indicating beam of the instrument 32 is so great that the limit contact 42' is touched by a contact blade (not shown) connected to the beam, a signal is transmitted to the associated alarm device 37 and the alarm device 37 delivers, for instance, a warning note. The boiler operative then merely needs to glance at the three indicating instruments to find out that a tube has broken in the left-hand line. Since the indicating beam of the instrument 32 is inclined more than that of the instrument 33, the operative concludes that the location of the leakage is adjacent the end of the evaporator heating surface 8. Further, from the degree of inclination of the indicating beam of the indicating instrument 32, the operative can deduce the amount of leakage and can accordingly immediately or at a suitable moment switch off the steam generator to repair the breakage. When the amount of leakage is assessed on the basis of the inclination of the instrument beam, the loading condition of the steam generator at the moment should be taken into account.

In a case where a steam generator is constructed with four lines connected in parallel, the four lines are connected in pairs to the pressure measuring devices, transducers and indicating devices. In comparison with the generator illustrated in FIG. 1, therefore, the arrangement between the inlet distributor 4 and the discharge collector 13 is doubled. In this case, therefore, pairs of flow paths are compared, and in the simplest instance this is enough to monitor all the four lines for any tube breakages.

Referring to FIG. 2, an alternate detector system can be used to obtain a clearer indication where four lines or flow paths of a steam generator are in parallel by forming a mean value of the measured values of an operating variable and comparing each measured value with this mean value. For example, lines 70, 70', 70'' and 70''' connect four connecting lines 9 to 9''' in the four parallel flow paths to a pressure equalising vessel 72. Each of the lines 70 to 70''' has a throttle 71 to 71''' of fixed adjustment which allows only a negligibly small rate of flow in comparison with the rates of flow in the lines 9 to 9'''. Interposed between the equalising vessel 72 and the connecting lines 9 to 9''' are pressure difference measuring devices 73 to 73''' which compare the pressure in a respective line 9 and the equalising vessel 72 and from which any difference in pressure can be read off.

In normal operation, when substantially identical pressures are present in all the four connecting lines 9 to 9''', the indicating beams in the measuring devices 73 to 73''' are substantially horizontal. If because of a tube breakage, e.g. in the flow path having the connecting line 9''', the pressure in the latter line is lower than in the other lines, working medium flows through the lines 70 to 70'' into the equalising vessel 72 and thence via the line 70''' to the connecting line 9'''. A new pressure is therefore set up in the equalising vessel 72 which corresponds to a mean value and is between the pressure in the connecting lines 9 to 9'' and that in the connecting line 9''', but is not very different from the pressure in the three lines 9 to 9''. Correspondingly, the indicating beams in the measuring devices 73 to 73'' are inclined only a little, whereas the indicating beam of the measuring device 73''' is inclined substantially more strongly in the opposite direction. From this, the operative can clearly conclude that pressure is too low in the connecting line 9''' and that therefore there is a tube breakage in the associated line.

In the systems described, the operating variable measured is the pressure of the working medium flowing in the flow paths and the difference in pressure between the individual paths is used to indicate a tube breakage. It will be realized that, instead of the pressure, the temperature of the working medium can be measured at corresponding places in the flow paths, the temperatures being compared with one another. Moreover, instead of the signals resulting from the comparisons being delivered to alarm devices, they can be delivered to a logic system, such as a digital computer, which decides, when a tube breaks, whether the steam generator should be switched off or whether it is enough to give the boiler operative a preliminary warning.

What is claimed is:

1. In combination with a forced flow steam generator having a tube system including more than two parallel flow paths for a working medium flowing at equal rates and an equal number of series connected heating surfaces of similar construction in said flow paths; a tube leakage detector system for detecting leaks in said tube system, said detector system comprising first means connected to corresponding points in said flow paths for forming a mean value of values of the working medium which change in the event of leakage, second means connected to said flow path for comparing each said value of the working medium with said mean value to transmit a signal in response to a predetermined difference between said mean value and said value of the working medium indicative of a leak.

2. The combination as set forth in claim 1 wherein said second means is a differential pressure measuring means for measuring changes in pressure.

3. The combination as set forth in claim 1 wherein said first means for forming a mean value comprises a pressure equalising vessel connected to each of said flow paths.

4. The combination as set forth in claim 1 wherein said second means includes at least a pair of pressure measuring members, each pressure measuring member being connected to one of said flow paths and to said first means between a pair of adjacent heating surfaces in each flow path and having an indicating means therein for indicating a difference in pressure in said flow paths in response to said signals.

5. The combination as set forth in claim 4 wherein said indicating means includes a pivotally mounted beam for pivoting into an angular disposition indicating the strength of a signal received.

References Cited

UNITED STATES PATENTS

| | | | |
|---|---|---|---|
| 2,777,812 | 1/1957 | Powell et al. | 73—40.5 X |
| 3,074,265 | 1/1963 | Symons | 73—49.2 |
| 3,425,264 | 2/1969 | Frei | 73—40.5 |

FOREIGN PATENTS

| | | | |
|---|---|---|---|
| 356,322 | 9/1931 | Great Britain | 73—40 |

OTHER REFERENCES

Marks' Mechanical Engineers' Handbook, 6th ed. N.Y., McGraw-Hill, 1958, pp. 9–26 to 9–27.

LOUIS R. PRINCE, Primary Examiner

J. W. ROSKOS, Assistant Examiner

U.S. Cl. X.R.

73—388